(12) United States Patent
Wood et al.

(10) Patent No.: US 12,422,055 B2
(45) Date of Patent: Sep. 23, 2025

(54) PNEUMATIC ACTUATION VALVE ASSEMBLY

(71) Applicant: War Machine, Inc., Taylors, SC (US)

(72) Inventors: Michael Wood, Taylors, SC (US); Chris Vandenberghe, Taylors, SC (US)

(73) Assignee: War Machine, Inc., Taylors, SC (US)

( * ) Notice: Subject to any disclaimer, the term of this patent is extended or adjusted under 35 U.S.C. 154(b) by 0 days.

(21) Appl. No.: 18/638,903

(22) Filed: Apr. 18, 2024

(65) Prior Publication Data

US 2024/0263718 A1    Aug. 8, 2024

Related U.S. Application Data

(63) Continuation-in-part of application No. 18/057,213, filed on Nov. 20, 2022, now Pat. No. 11,988,300, and a continuation of application No. 17/065,915, filed on Oct. 8, 2020, now Pat. No. 11,536,391.

(60) Provisional application No. 63/632,196, filed on Apr. 10, 2024, provisional application No. 63/632,479, filed on Apr. 10, 2024, provisional application No. 62/912,487, filed on Oct. 8, 2019.

(51) Int. Cl.
*F41B 11/721* (2013.01)
*F16K 31/16* (2006.01)

(52) U.S. Cl.
CPC ............. *F16K 31/16* (2013.01); *F41B 11/721* (2013.01)

(58) Field of Classification Search
CPC ....... F41B 11/72; F41B 11/721; F41B 11/722; F41B 11/723; F41B 11/724; F41B 11/73; F41B 11/00
USPC ............. 251/58; 124/63–67, 69, 71–72, 73, 124/75–77
See application file for complete search history.

(56) References Cited

U.S. PATENT DOCUMENTS

| 2006/0027221 A1* | 2/2006 | Farrell | F41B 11/723 124/31 |
| 2019/0257612 A1* | 8/2019 | Gardner, Jr. | F41B 11/723 |

FOREIGN PATENT DOCUMENTS

| DE | 102008051624 B4 * | 5/2016 | ........ F16K 11/0712 |
| WO | WO-2016178587 A1 * | 11/2016 | |

* cited by examiner

*Primary Examiner* — John Cooper
(74) *Attorney, Agent, or Firm* — Kim and Lahey Law Firm, LLC; Douglas William Kim

(57) ABSTRACT

This system is a pneumatic actuation valve assembly that can include a frame; a timing spool housing; a timing spool carriage; a timing spool; a magnet configured to bias the timing spool in a forward position; a main spool and configured to travel toward a frame forward portion when a fluid is received into a mid-main spool pressure area wherein the main spool actuates a bolt carried by the frame and is configured to receive a projective in an open position and chamber the projective in a closed position; and, a bore defined in the timing spool configured to allow pressure in a rear main spool pressure area to escape through the bore releasing rearward pressure on the timing spool allowing the timing spool to travel from the rearward position to the forward position according to an attraction of the magnet.

20 Claims, 10 Drawing Sheets

PNEUMATIC ACTUATION VALVE ASSEMBLY

REFERENCE TO RELATED APPLICATIONS

This application claims priority from U.S. patent application Ser. No. 18/057,213 filed Nov. 20, 2022 which claims priority from U.S. patent application Ser. No. 17/065,915 (now patent Ser. No. 11/536,391) which claim priority from U.S. Provisional Patent Application Ser. No. 62/912,487 filed Oct. 8, 2019 and U.S. patent application Ser. No. 17/953,109 filed Sep. 26, 2022 which claim priority from U.S. Provisional Patent Application Ser. No. 62/244,8608 filed Sep. 27, 2021 each of which is incorporated by reference.

BACKGROUND OF THE ASSEMBLY

1) Field of the Assembly

This assembly is directed to a pneumatic actuation valve assembly for using gas to apply force on an object such as a projectile.

2) Description of the Related Art

When reviewing pneumatic actuation valves, especially in applications such as paintball guns, paintball markers, shirt guns, there are basically two types, electrical and mechanical. Generally, mechanical guns are more reliable and need little regular maintenance. They are generally easy to disassemble, and replacement parts are generally inexpensive. Only basic mechanical skill is needed to perform most maintenance on these mechanical platforms. However, these mechanical guns are typically not as fast, accurate, or consistent as electronic guns. The exact amount of air that propels the paintball from the barrel varies from shot to shot and the speed of the ball can vary affecting accuracy. Mechanical guns must be cocked before they can be fired and typically require a higher fluid (e.g. compressed air) pressure to operate resulting in fewer shots per tank of air. Examples of these prior attempts at paintball guns and shirt guns are shown in U.S. Pat. Nos. 6,361,460 and 7,624,726; United States Patent Applications Publication 2007/0028909 and 2009/0101129 and International Patent Application PCT/US07/16582.

In contrast, electric guns typically are smaller and lighter. Since the activation of the firing cycle is with electronic circuitry, the trigger pull can be light and is not reliant upon the pressure in the platform. However, disadvantages include increased difficulty to repair and usually require professional servicing. Moisture in the electronics can harm and even destroy the electric gun so that they are adversely affected by certain environmental conditions (e.g. rain, high humidity, etc.). Examples of electric guns can be found in U.S. Pat. Nos. 7,882,830; 6,889,682 and 6,520,172.

It is an object of the present invention to provide for a pneumatic actuation valve assembly that has an improved fire rate, has a lighter trigger pull and is generally light weight.

BRIEF SUMMARY OF THE ASSEMBLY

The above objectives are accomplished by providing a pneumatic actuation valve assembly comprising: a frame; a timing spool housing received in the frame; a timing spool carriage received in the timing spool housing; a timing spool slidably received in the timing spool carriage and disposed at a frame rear portion; a timing spring carried by the timing spool and configured to hold the timing spool in a forward position at a first phase of an operating cycle and to allow the rearward movement to a rearward position at a second phase of the operating cycle; a main spool at least partially received in the timing spool housing and configured to travel toward a frame forward portion when a fluid is received into a mid-main spool pressure area wherein the main spool actuates a bolt carried by the frame and configured to receive a projective in an open position and chamber the projective in a closed position; and, a bore defined in the timing spool configured to allow pressure in a rear main spool pressure area to escape through the bore releasing rearward pressure on the timing spool allowing the timing spool to travel from the rearward position to the forward position according to pressure exerted by the timing spring.

A pressurized fluid source can be in fluid communications with a rear frame opening; and an actuator can be directly or indirectly attached to the frame and configured to allow pressurized fluid from the pressurized fluid source to enter a timing spool pressure area. A first timing spool carriage opening defined in the timing spool carriage can be configured to allow pressurized fluid to enter the rear main spool pressure area and force the main spool toward the frame forward portion. A bolt can be disposed in the frame wherein the main spool is configured to force the bolt forward when pressurized fluid enters a bolt pressure area, when the main spool travels toward a frame front portion included in the frame. When the bolt goes through the operating cycle, the bolt can be in a rear position allowing a projectile to enter a chamber, travel forward to close the chamber allowing pressurized fluid to eject the projectile from a barrel or other component. The bolt can also be operated manually with the timing spool and its associated components used to eject a projectile. The projectile can be compressed fluid such as air, liquid, solid, paint ball ammunition, shirt, and other articles.

A spring can be disposed in the frame and configured to move the bolt rearward when pressure in the bolt pressure area is released. A first timing spool diameter can be included in the timing spool and disposed at a timing spool forward end and a second timing spool diameter disposed at a time spool rearward end where the first timing spool diameter can be less than the second timing spool diameter in one embodiment. A forward bolt seal can be included in the frame having a forward bolt seal diameter configured to determine an amount of pressure to eject a projectile according to the size of the forward bolt seal diameter.

The pneumatic actuation valve assembly can include a frame; a timing spool received in the frame; a spring carried by the timing spool and configured to bias the timing spool in a forward position; a main spool disposed in the frame and configured to travel toward a frame forward portion when a fluid is received into a mid-main spool pressure area; and a bore defined in the timing spool configured to allow pressure in a rear main spool pressure area to escape through the bore releasing rearward pressure on the timing spool allowing the timing spool to travel from a rearward position to the forward position according to pressure exerted by the spring.

An actuator can be attached to the frame configured to allow pressurized fluid to enter a timing spool pressure area. The actuator can be a trigger assembly. The fluid can be compressed air. The system can include a timing spool disposed in the frame configured to actuate a main spool disposed in the frame to travel toward a frame forward portion when a fluid is received into a mid-main spool pressure area; a timing spring carried in the timing spool configured to bias the timing spool toward the frame forward portion; and a bore defined in the timing spool configured to allow pressure in a rear main spool pressure area to escape through the bore releasing pressure on the timing spool allowing the timing spool to travel from a rearward position to a forward position. The timing spool housing can be received into the frame and configured to allow pressurized fluid to enter the timing spool housing and to be directed to a timing spool pressure area. A main spool can be received in the timing spool housing and configured to receive the pressurized fluid into a rear main spool pressure area to actuate the main spool toward a frame forward portion; and a bolt can be received into the frame and configured to travel toward the forward frame portion when the pressurized fluid enters a bolt pressure area.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail.

Figure 1:
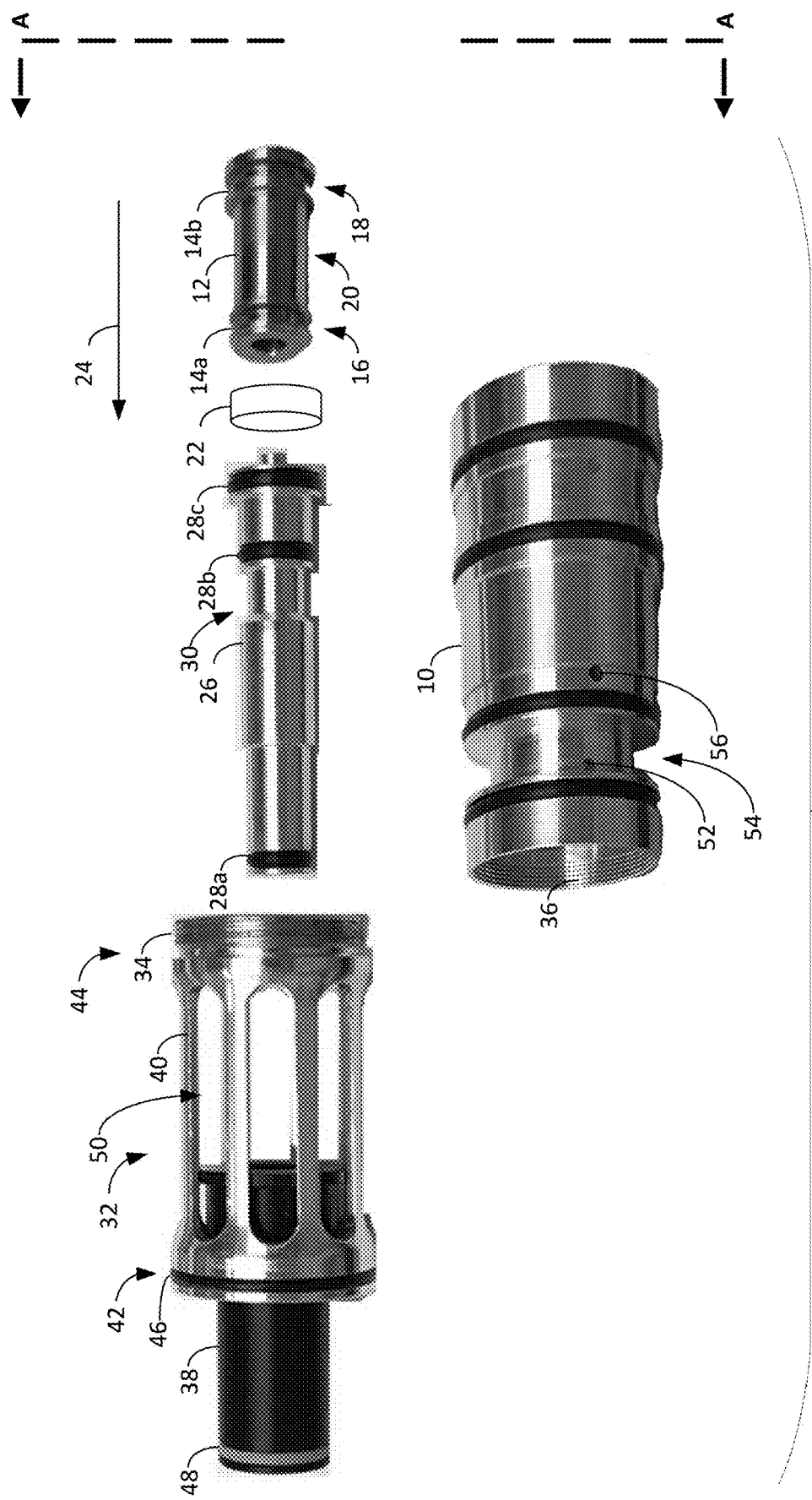
FIG. 1 is a schematic of various aspects of the assembly.

Referring to FIG. 1, a timing spool housing 10 is shown for containing various components of the assembly. A timing spool 12 can be disposed in the timing spool housing and be slidably carried by the timing spool housing. The timing spool can have recesses such as a forward recess 14a and a rearward recess 14b for one or more seals such as O-rings. The timing spool can include a timing spool forward end 16 that can include a first timing spool diameter. The timing spool can include a timing spool rearward end 18 that can have a second diameter. The first diameter can be less than the second diameter. A timing spool pressure area 20 can be defined in the timing spool and can be disposed between the forward end and the rearward end.

A magnet 22 can be disposed in the timing spool housing and can bias the timing spool in a forward direction 24. A main spool 26 can be disposed in the timing spool housing and be slidably carried by the timing spool housing. The main spool can include recesses for receiving seals such as O-rings including a first main seal 28a, a second main seal 28b and a third main seal 28c. The main spool can include a mid-main spool pressure area 30 for receiving and releasing pressured fluid (e.g. gases) during in functional cycle. The main spool can be partially received on the timing spool housing.

A bolt assembly 32 can be carried by the timing spool housing. The bolt assembly can be removably attached to the timing spool housing 10. The attachment can be by a threaded area 34 with corresponding threads 36 in the timing spool housing in one embodiment. A bolt 38 can be included in the bolt assembly and slidably carried in a bolt housing 40. The bolt housing can include a bolt forward end 42 and a bolt rearward end 44. A bolt housing seal 46 can be included in the bolt assembly. The bolt can include a bolt seal 48 and can be included with the bolt. The bolt housing can include slots 50 defined in the housing allowing fluid to flow externally and internally to the bolt housing.

Figure 2:
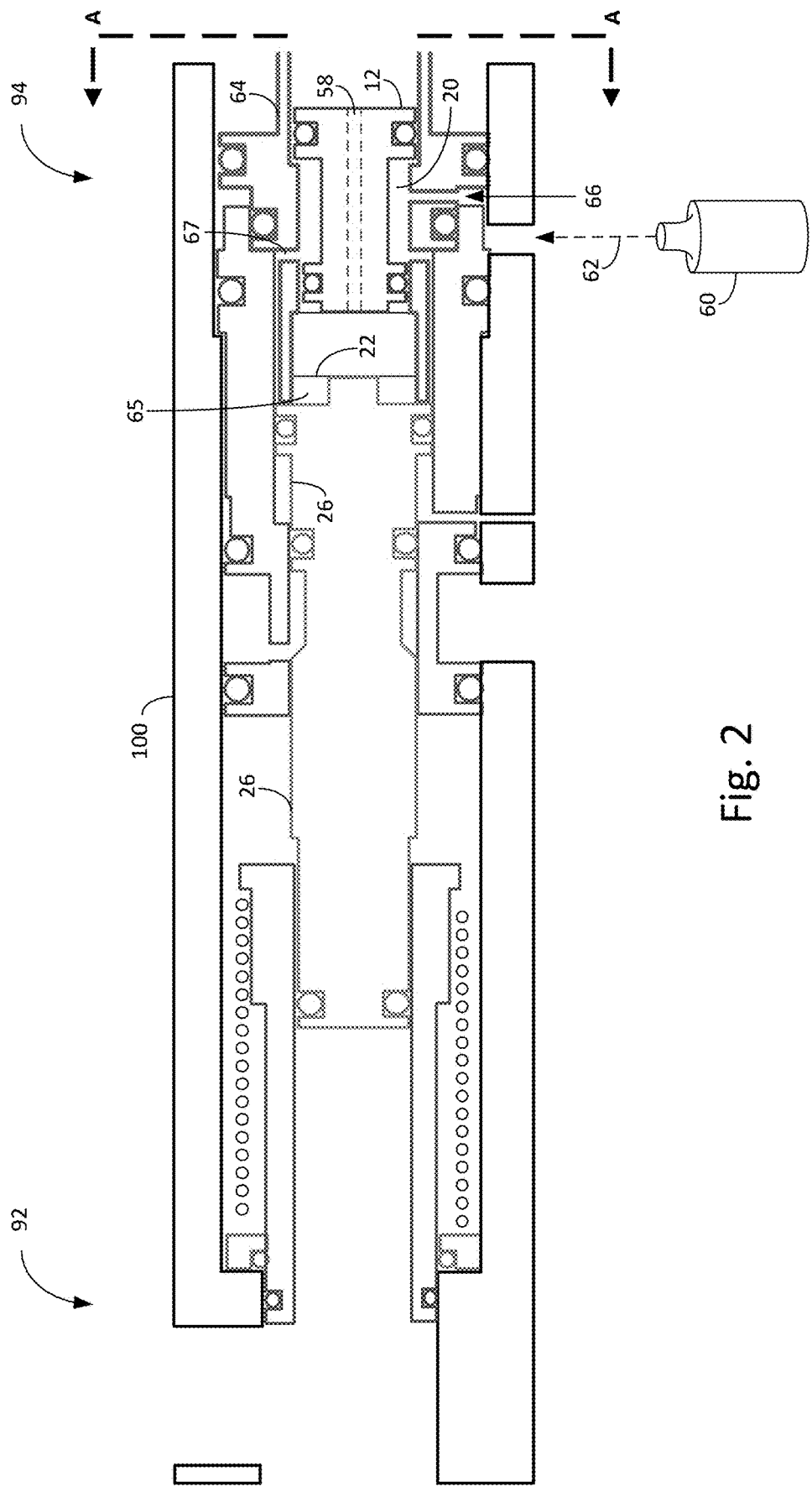
FIG. 2 is a cross section along lines A-A of FIG. 1.

The timing bolt housing can include a first timing spool housing opening 52, a timing spool housing pressure area 54 and a second timing spool housing opening 56. Referring to FIG. 2, a frame 100 is shown for carrying the various components of the pneumatic actuation valve assembly. The timing spool 12, having a bore 58, is shown in a forward position against magnet 22. When a trigger assembly is actuated, the operating cycle is begun and compressed fluid (e.g. air or $CO_2$) enters the timing spool pressure area 20 from fluid source 60 through rear frame opening 62 and into a timing spool carriage 64 through a first timing spool carriage opening 66 filling timing spool pressure area 20. During this first phase of the operating cycle, the timing spool is in a forward position. The pressure in the timing spool pressure area leaves the timing spool carriage and enters the timing spool housing through a second timing spool carriage opening 67. Pressure is then delivered to a rear main spool pressure area 65 forcing the main spool 26 toward a frame forward portion 92 opposite a frame rear portion 94.

The trigger assembly can include a trigger that can actuate a valve between a fluid pressure container and the frame so that when the trigger is actuated, pressurized fluid exits the fluid container and enters one or more of the pressure areas described herein.

Figure 3:
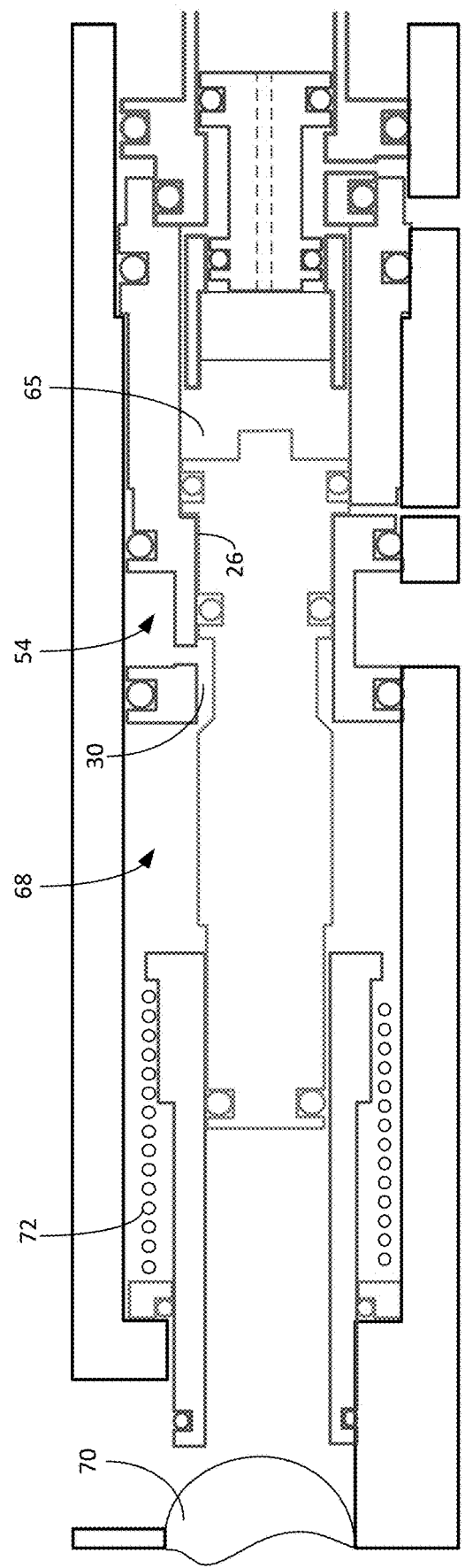
FIG. 3 is a cross section along lines A-A of FIG. 1.

Referring to FIG. 3, the main spool 26 is moved forward and fluid (e.g. compressed air) travels from a timing spool pressure area 54, into the mid main spool pressure area 30 and into bolt pressure area 68. This pressure forces the bolt forward and chambers a projectile 70. The pressures overcome bolt spring 72 allowing the bolt to travel forward.

Figure 4:
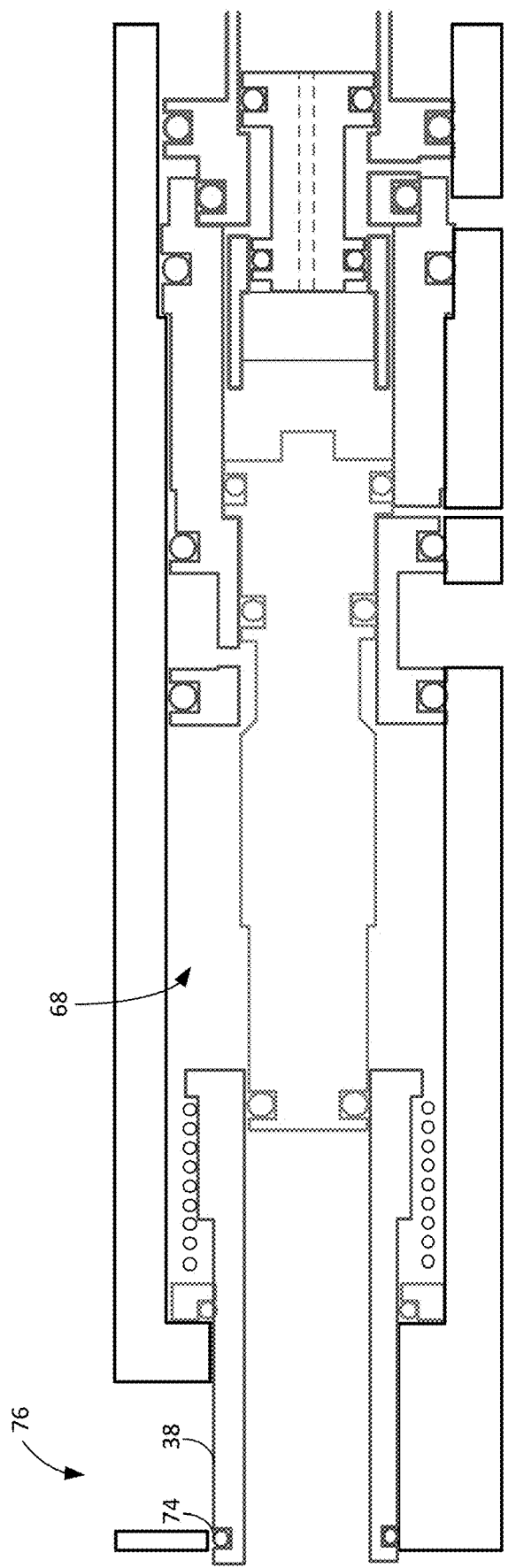
FIG. 4 is a cross section along lines A-A of FIG. 1.

Referring to FIG. 4, the bolt 38 is in a forward position closing the bolt. Bolt seal 74 prevents pressure from backflowing into the projectile feeding area 76 or rearward of the projectile feeding area. The projectile is forward with the bolt in the chamber. The bolt pressure area 68 remains pressurized and the main spool 26 is in the forward position.

Figure 5:
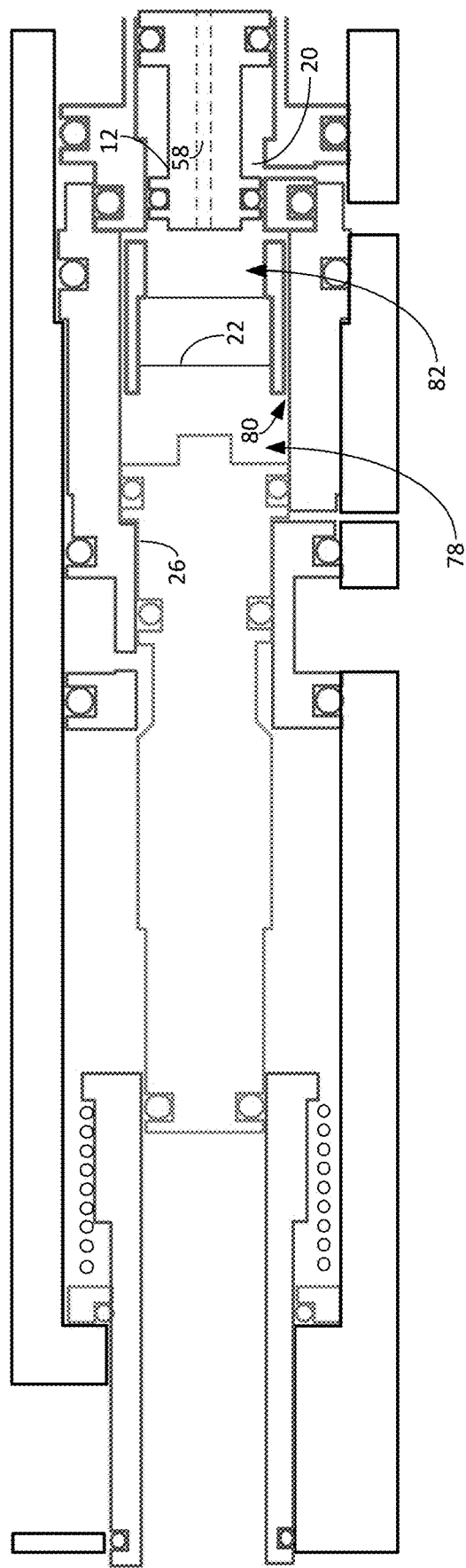
FIG. 5 is a cross section along lines A-A of FIG. 1.

Referring to FIG. 5, the timing spool 12 is shown in a second phase of the operating cycle. As pressure is delivered from the pressure source into timing spool pressure area 20, timing spool 12 is moved rearward as the pressure overcomes the timing spring 1001 and the timing spring compresses. The force of the timing spring exerted on the timing spool to bias the timing spool in a forward position can be described by the following:

$$F_s = -k\Delta x \qquad (1)$$

where $F_s$ is the forced exerted on the timing spool, k is the spring constant and $\Delta x$ is the compression distance of the spring.

When sufficient pressure is achieved to overcome the timing spring, the timing spring 1001 is compressed and timing spool 12 moves rearward allowing the fluid rearward of the main spool 26, in area 78 to escape along path 80 into an area forward of the timing spool and rear the main spool. The pressure in timing spool pressure area 20 is sufficient to overcome the force exerted by the timing spring allowing the timing spool to travel rearward allowing fluid to escape from area 82 out bore 58.

By changing the spring constant or the available compression distance of the spring, the amount of force necessary to overcome the timing spring and move the timing spool 12 rearward can be adjusted. The use of the timing spring allows for continued and increasing forward pressure on the timing spool. The movement of the timing spool can be made gradually as contrasted to the rapid movement which is achieved when the attractive force of a magnet is overcome.

Figure 6:
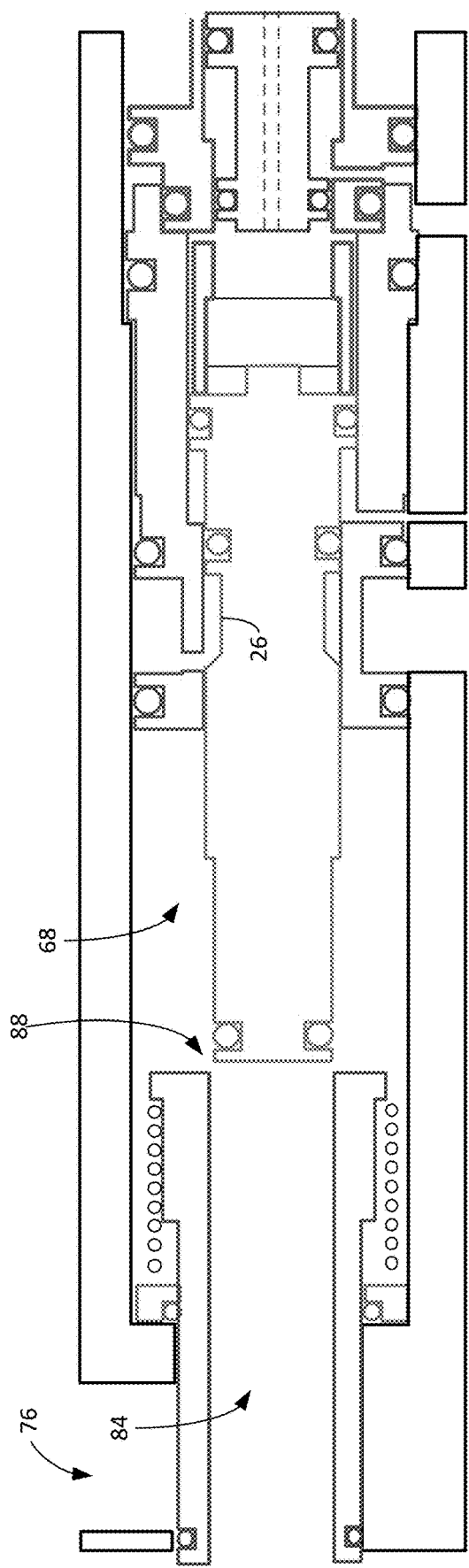
FIG. 6 is a cross section along lines A-A of FIG. 1.

Referring to FIG. 6, pressure is then relieved from behind the main spool and the main spool is positioned rearward. Pressure in bolt pressure area 68 escapes around the main spool into the bolt bore 84 through space 88 thereby forcing the projectile out the chamber.

Figure 7:
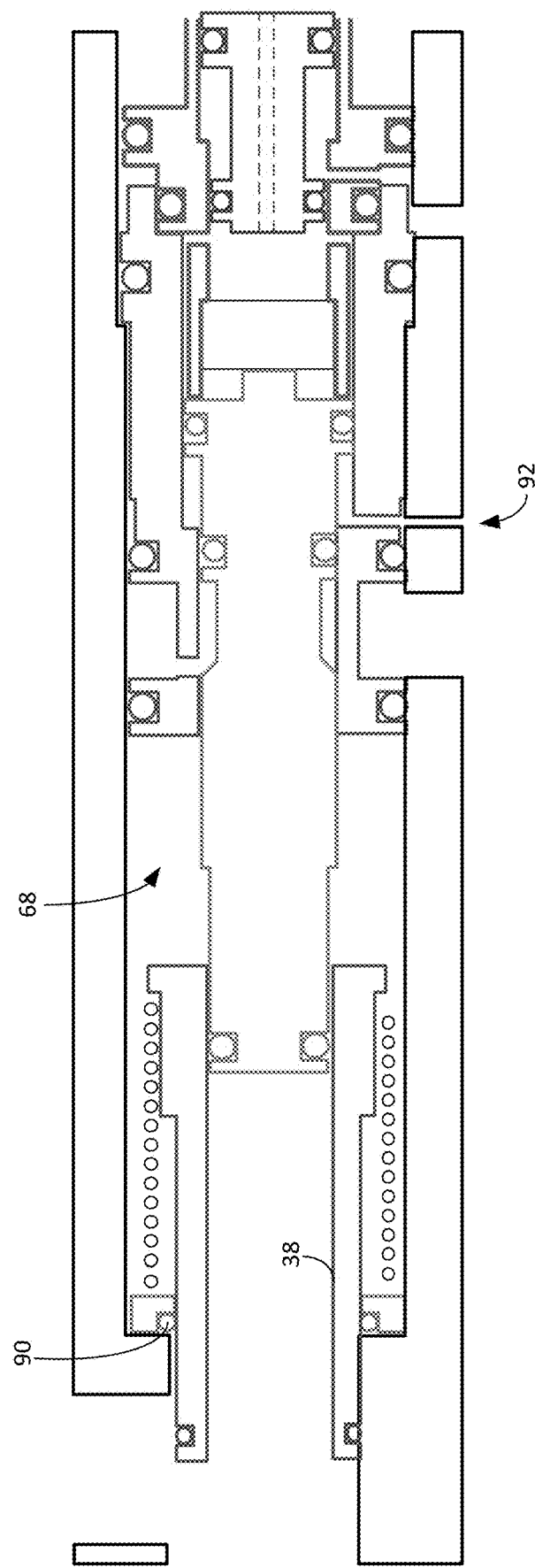
FIG. 7 is a cross section along lines A-A of FIG. 1.

Referring to FIG. 7, once the pressure is relieved from the bolt 38 pressure area 68 the pressure is reduced so that the bolt spring travels into the rearward position.

Figure 8:
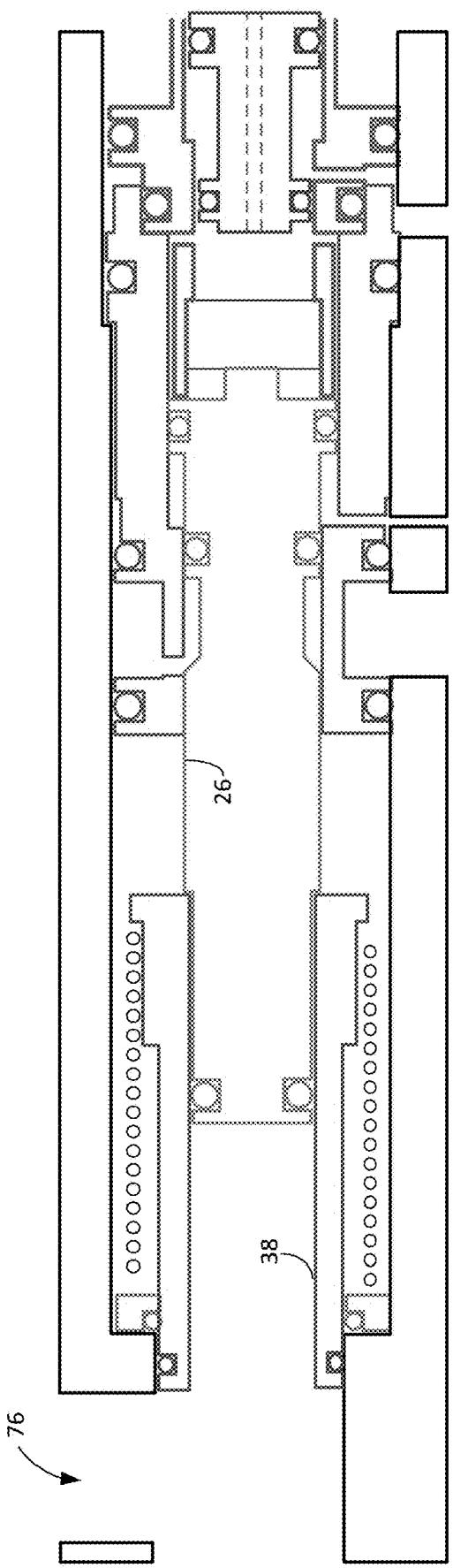
FIG. 8 is a cross section along lines A-A of FIG. 1; and,
FIG. 9 is a cross section along lines A-A of FIG. 1.

Referring to FIG. 8, the bolt 68 is in the rearward position and the main spool 26 is in the rearward position. The projectile feeding area 76 is no longer obstructed by the bolt allowing a projectile to be positioned forward of the bolt.

Figure 9:
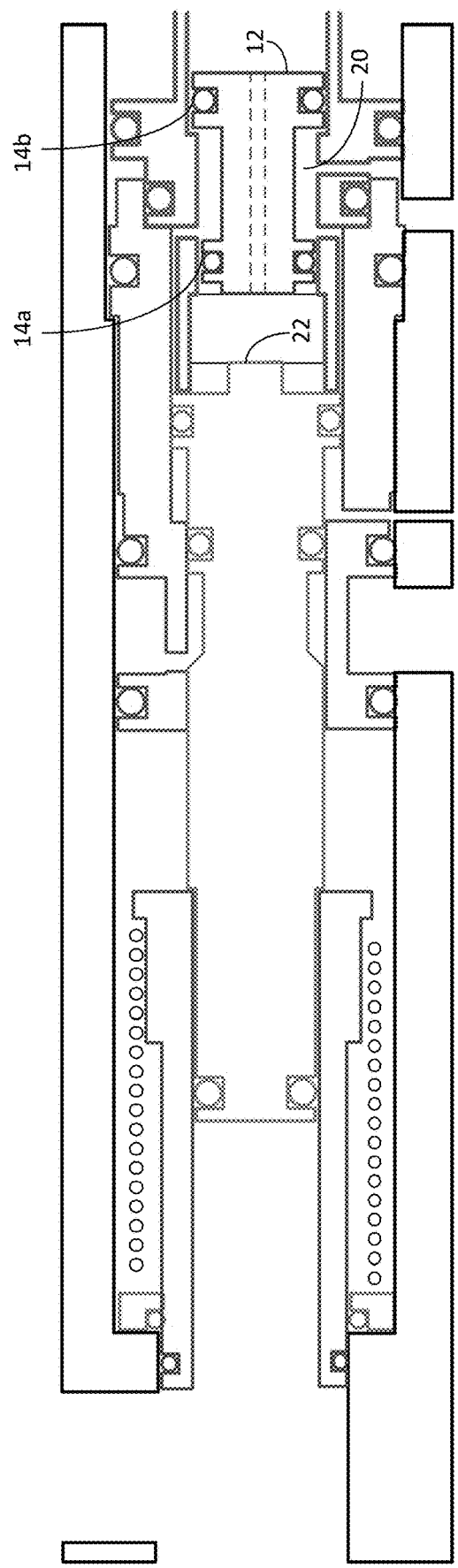

Referring to FIG. 9, when the pressure is relieved from the timing spool pressure area 20, the timing spool 12 is attracted to the magnet 22 and positioned forward. When a timing spring 1001 is used in alternative or addition to a magnet, the reduced pressure in pressure area 20 is overcome by the force of the timing spring, and the timing spool 12 returns to the position for the first phase of an operating cycle.

The diameter of the timing spool recesses 14a and 14b and the ratio between these two recesses (e.g. diameter 14a: diameter 14b) can be modified to change the pressures required to release the timing spool from the magnet thereby changing the speed in which the timing spool will initiate the cycles described herein. The amount of pressure used to eject the projectile can be modified by changing the diameter of a forward bolt seal 90. An exhaust port 92 can be included to allow fluid to escape during the operating cycles as described herein.

Further adjustments can be made with the use of a timing spring. Changing the tension, diameter, and/or length of the spring can all be used to change the pressure required to overcome the timing spring and move the timing spool rearward to initiate the cycle described herein. The operation of the timing spool can be impacted by the timing spring used and the force placed on the timing spool by the timing spring. In one embodiment, the timing spring can be removable and different springs can be used varying the operation of the timing spool. In one embodiment, the more resistant placed on the spring the slower the fire rate.

The cycle can be repeated. When viewing FIGS. 1-9 it can be seen that the figures represent an operational cycle that can be configured to receive a projectile and eject a projectile from a chamber. The first phase of an operating cycle and second phase of an operating cycle can correspond to to the alternative positions of the timing spool: forward and rearward. In this embodiment, and during each phase of the operating cycle, other parts of the assembly are moving and functioning while the timing spool is held constant. The cycling of the timing spool controls the flow of pressurized fluid through the system/assembly and ultimately out of the chamber carrying a projectile with it.

During the first phase of the operation cycle other movements and functions of the assembly can include, opening the flow of pressurized fluid from a pressurized fluid source to the assembly, directing pressurized fluid from the pressurized fluid source through the assembly, pressurized fluid flowing from a timing spool pressure area, into the mid main spool pressure area and into a bolt pressure area, pressure in the bolt pressure area overcoming a bolt spring allowing the bolt to travel forward, moving a bolt within the frame forward to strip a projectile from a feeder tray, moving a main spool within the frame, moving the bolt forward to chamber a projectile, moving the bolt forward to a closed position, accumulating pressurized fluid in a firing chamber and/or main spool pressure area, charging a firing chamber and/or main spool pressure area, pressurizing a firing chamber and/or main spool pressure area, accumulating pressurized fluid in the timing spool pressure area, pressurizing the timing spool pressure area and any combination. The transition from the first phase to the second phase of the operation cycle occurs when the pressure rearward on the timing spool overcomes the timing spring pressure forward and the timing spool is moved rearwards.

During the second phase of the operation cycle other movements and functions of the assembly can include arresting the flow of pressurized fluid from the pressurized fluid source, further pressurizing the firing chamber and/or main spool pressure area, releasing pressurized fluid in the firing chamber and/or main spool pressure area to the bore ejecting the projectile in the chamber, cycling the main spool rearward within the frame by a biasing force such as a bolt or main spool spring, moving the main spool rearward to a position where the firing chamber and/or main spool area can collect pressurized fluid, moving the bolt rearward to open the chamber, moving the bolt rearward to clear the feeder tray, moving a projectile from the feeder tray to inline with the bore, releasing pressure from the assembly including the timing spool pressure area. The transition from the second phase to the first phase occurs when the timing spring overcomes the pressure in the timing spool pressure area and the timing spool moves forward.

During the operation cycle, the timing spool and main spool can come in contact with one another when the timing spool is in the forward most position and the main spool is in the rearward most position. In an alternative configuration, a spacer, step, or other mechanism within the system can prevent the timing spool and main spool from contacting one another.

The operation cycle can be initiated by use of a trigger, button, lever, or other mechanism. The cycle can be self-timing through the regulated flow of pressurized fluid through the system. The cycle can be made to arrest after one iteration or continue ad infinitum until the initiating mechanism is disengaged. In an embodiment where the cycle stops after one iteration, a natural stopping point is where the flow of pressurized fluid through the system has been arrested, the projectile has been ejected from the bore, the bolt returned rearward clearing the chamber and feeder tray, the main spool returned rearward to seal the firing chamber and/or main spool pressure area, the remnant pressure in the system released, and the timing spool returned to the forward position. In an alternative embodiment where the cycle is repeated until disengagement of the initiating mechanism, the cycle can include intermittent arrestation of the flow of pressurized fluid from the pressurized fluid source. Said intermittent arrestation can occur in the second phase during the process of ejecting the projectile and de-pressurizing the system. In said embodiment, upon the return of the timing spool to a forward position the flow of pressurized fluid to the system is restored and the cycle repeats until the initiating mechanism is disengaged.

The timing spool mechanism can be used within, in conjunction with, and adjacent to alternative cyclic operations while achieving the same essential purpose of controlling, that is timing, the release of pressurized fluid used to eject a projectile from the assembly.

While the embodiments shown have a single bore axis with the main spool and timing spool in line with said bore axis, alternative embodiments where the axis of the main spool and the axis of the timing spool are not aligned are possible. In the alternative embodiments, the timing spool pressure area and main spool pressure area remain in fluid communication with one another to otherwise function as described.

The assembly can also be used for other applications where the opening and closing of an action and the injection or expulsion of compressed gas with a system that cycles quickly is needed. The assembly described herein can be a weapon platform such as a paint ball action for a pistol or rifle, pellet gun or BB gun. The assembly described herein can be used for tools such as nail guns, rivet driver and other applications using impact or compression force for operation and construction.

Figure 10:
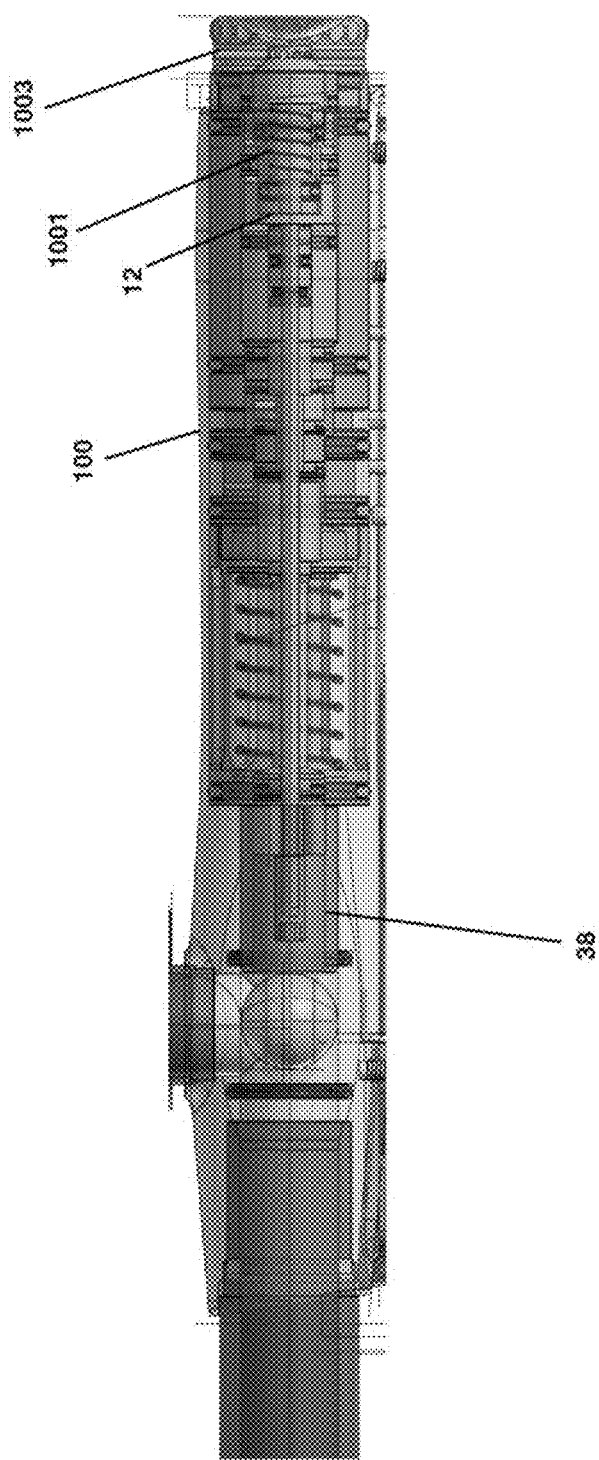
FIG. 10 is a cross section of an assembled embodiment of the assembly.

Referring to FIG. 10, in an alternative configuration, the magnet can be substituted with or supplemented by a timing spring 1001 carried by timing spool 12 and received partially in bore 58 (FIG. 2). The timing spring 1001 biases the timing spool 12 forward by exerting pressure upon the timing spool 12 and a frame end cap 1003.

Similar to the magnet, the timing spring biases the timing spool forward in a first phase of an operating cycle. The timing spool is held in a forward position by the force exerted thereby controlling the flow of pressurized fluid from the pressurized fluid source to the firing chamber/main spool pressure area of the assembly.

The system can include a frame having a bore axis; a timing spool received in the frame and adapted to reciprocate along the bore axis; a timing spring carried by the timing spool configured to bias the timing spool in a forward position at a first phase of an operating cycle; a main spool received in the frame and configured to travel along the bore axis toward a frame forward position wherein the main spool actuates a bolt carried by the frame and configured to receive a projectile in an open position and chamber the projectile in a closed position; and, whereas the timing spring is configured to transition rearward upon an application of a pressure at a second phase of the operating cycle thereby ejecting the projectile.

The cavity can be defined in the timing spool configured to receive the timing spring and bias the timing spool forward until pressure applied to a forward end allowing the timing spool to transition from the forward position to a rearward position allowing pressure to actuate the main spool. In the rearward position, the timing spool can be adapted to release fluid from the forward end thereby resetting the timing spool. An actuator can be configured to allow pressurized fluid to enter a timing spool pressure area. A first frame opening can be defined in the frame configured to allow pressurized fluid to enter a rear main spool pressure area and force the main spool toward a frame forward portion. The main spool can be configured to force a bolt forward when pressurized fluid enters a bolt pressure area when the main spool transitions toward a frame front portion included in the frame. The bolt can be configured to receive pressured fluid from a bolt pressure area into a bore defined in a barrel and carried by the frame to eject the projectile.

A bolt spring can be disposed in the frame configured to move a bolt rearward when pressure in a bolt pressure area is released. A forward bolt seal cam be included in the frame having a forward bolt seal diameter configured to determine an amount of pressure to eject the projectile according to a size of the forward bolt seal diameter.

The frame can be a T-shirt gun frame and/or a paintball gun.

The system can include a frame; a timing spool received in the frame; a timing spring carried by the timing spool and configured to bias the timing spool in a forward position and transition the timing spool from the forward position to a rearward position upon an application of pressure upon the timing spool; and, a main spool disposed in the frame and configured to travel toward a frame forward position when a fluid is received into a mid-main spool pressure area. A cavity can be defined in the timing spool adapted to receive the timing spring and configured to receive pressure in a forward end of the timing spool and actuate the main spool upon pressure overcoming a timing spring force. A bolt can be received in the frame and wherein the main spool is configured to actuate the bolt to receive a projectile into a chamber defined in the frame when the bolt is in an open position. An actuator can be attached to the frame configured to allow pressurized fluid to enter a timing spool pressure area and can be a trigger assembly.

The assembly of claim 12 wherein the main spool is configured to force a bolt, carried by the frame, forward when pressurized fluid enters a bolt pressure area when the main spool transitions toward a frame front portion included in the frame.

A pneumatic actuation valve assembly can include a frame; a timing spool disposed in the frame configured to actuate a main spool disposed in the frame to travel toward a frame forward portion when a fluid is received into a mid-main spool pressure area; and a timing spring disposed in the frame configured to bias the timing spool toward the frame forward portion. A cavity can be defined in the timing spool configured to receive the timing spring and adapted to receive pressure at a front end sufficient to overcome a timing spring force to actuate the main spool to eject a projectile. A timing spool housing can be received into the frame and configured to allow pressurized fluid to enter the timing spool housing and to be directed to a timing spool pressure area; wherein the main spool is received in the timing spool housing and configured to receive the pressurized fluid into a rear main spool pressure area to actuate the main spool toward a frame forward portion; and, a bolt received into the frame and configured to transition toward the forward frame portion when the pressurized fluid enters a bolt pressure area.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A pneumatic actuation valve assembly comprising:
   a frame having a bore axis;
   a timing spool received in the frame and adapted to reciprocate along the bore axis;
   a timing spring carried by the timing spool configured to bias the timing spool in a forward position at a first phase of an operating cycle;
   a main spool received in the frame and configured to travel along the bore axis toward a frame forward position wherein the main spool actuates a bolt carried by the frame and configured to receive a projectile in an open position and chamber the projectile in a closed position; and,
   whereas the timing spring is configured to transition rearward upon an application of a pressure at a second phase of the operating cycle thereby ejecting the projectile.

2. The assembly of claim 1 including a cavity defined in the timing spool configured to receive the timing spring and bias the timing spool forward until pressure applied to a forward end allowing the timing spool to transition from the forward position to a rearward position allowing pressure to actuate the main spool.

3. The assembly of claim 2 where in the rearward position the timing spool is adapted to release fluid from the forward end thereby resetting the timing spool.

4. The assembly of claim 3 including a first frame opening defined in the frame configured to allow pressurized fluid to enter a rear main spool pressure area and force the main spool toward a frame forward portion.

5. The assembly of claim 1 including an actuator configured to allow pressurized fluid to enter a timing spool pressure area.

6. The assembly of claim 1 wherein the main spool is configured to force a bolt forward when pressurized fluid enters a bolt pressure area when the main spool transitions toward a frame front portion included in the frame.

7. The assembly of claim 1 wherein the bolt is configured to receive pressured fluid from a bolt pressure area into a bore defined in a barrel and carried by the frame to eject the projectile.

8. The assembly of claim 1 including a bolt spring disposed in the frame configured to move a bolt rearward when pressure in a bolt pressure area is released.

9. The assembly of claim 1 including a forward bolt seal included in the frame having a forward bolt seal diameter configured to determine an amount of pressure to eject the projectile according to a size of the forward bolt seal diameter.

10. The assembly of claim 1 wherein the frame is included in a T-shirt gun frame.

11. The assembly of claim 1 wherein the frame is included in a paintball gun.

12. A pneumatic actuation valve assembly comprising:
    a frame;
    a timing spool received in the frame;
    a timing spring carried by the timing spool and configured to bias the timing spool in a forward position and transition the timing spool from the forward position to a rearward position upon an application of pressure upon the timing spool; and,
    a main spool disposed in the frame and configured to travel toward a frame forward position when a fluid is received into a mid-main spool pressure area.

13. The assembly of claim 12 including a cavity defined in the timing spool adapted to receive the timing spring and configured to receive pressure in a forward end of the timing spool and actuate the main spool upon pressure overcoming a timing spring force.

14. The assembly of claim 12 including a bolt received in the frame and wherein the main spool is configured to actuate the bolt to receive a projectile into a chamber defined in the frame when the bolt is in an open position.

15. The assembly of claim 12 including an actuator attached to the frame configured to allow pressurized fluid to enter a timing spool pressure area.

16. The assembly of claim 15 wherein the actuator is a trigger assembly.

17. The assembly of claim 12 wherein the main spool is configured to force a bolt, carried by the frame, forward when pressurized fluid enters a bolt pressure area when the main spool transitions toward a frame front portion included in the frame.

18. A pneumatic actuation valve assembly comprising:
    a frame;
    a timing spool disposed in the frame configured to actuate a main spool disposed in the frame to travel toward a frame forward portion when a fluid is received into a mid-main spool pressure area; and,
    a timing spring disposed in the frame configured to bias the timing spool toward the frame forward portion.

19. The assembly of claim 18 including a cavity defined in the timing spool configured to receive the timing spring and adapted to receive pressure at a front end sufficient to overcome a timing spring force to actuate the main spool to eject a projectile.

20. The assembly of claim 18 including:
    a timing spool housing received into the frame and configured to allow pressurized fluid to enter the timing spool housing and to be directed to a timing spool pressure area;
    wherein the main spool is received in the timing spool housing and configured to receive the pressurized fluid into a rear main spool pressure area to actuate the main spool toward a frame forward portion; and,
    a bolt received into the frame and configured to transition toward the forward frame portion when the pressurized fluid enters a bolt pressure area.

* * * * *